Nov. 29, 1960 E. P. ANDERSON ET AL 2,961,944

DIGITAL COMPUTER

Filed March 30, 1959

INVENTORS
E. Paul Anderson
James Guertin
BY Roland T. Bryan
ATTORNEY

United States Patent Office

2,961,944

Patented Nov. 29, 1960

2,961,944

DIGITAL COMPUTER

E. Paul Anderson, Burlington, N.J. (Algonquin Trail, Medford Lakes, N.J.), and James E. Guertin, Camden, N.J. (5437 Garfield Ave., Pennsauken, N.J.)

Filed Mar. 30, 1959, Ser. No. 802,724

5 Claims. (Cl. 101—93)

In digital computer arrangements, there is provided means for producing a plurality of electrical impulses arranged in a sequential order to represent a group of coded characters. These groups of characters are the output of a computer or may be represented by recording tape, punched cards, or any other well known devices which represent stored information.

These coded impulses, be they any of the above types, are normally fed into a decoding and printing device which has as its output printed information.

It is an object of the present invention to provide a more flexible computer arrangement and one which will print only predetermined portions of the coded information.

A further object is to provide a device which can be connected to existing computer printers to provide the special selective printing.

Moreover, the present invention provides a device which does not interfere with the arrangement information on the storage tape or cards and requires no special non-useful impulses on the tapes or cards to make it operate.

A more specific object of the invention is to search the groups of coded characters coming from the storage system and compare them to a predetermined sequence of characters which are desired to be selected. Upon finding comparison it causes the group containing these characters to be printed.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

For purposes of illustration, the present invention will be illustrated connected to the "High Speed Printer" of the "Univac System" which is manufactured and sold by Sperry Rand Corporation. This "High Speed Printer" is a device, which converts information magnetically recorded on tape (in the "Univac" binary code), into a printed record. It is composed of four separate units which are connected by cables.

The function of these units is to convert information recorded on magnetic tape to electrical impulses representing characters. It has means for producing a plurality of electrical pulses arranged in a sequential order to represent character groups known as "blockettes." This information is stored in a cold cathode gas tube memory which has a capacity of one group or blockette of characters.

A printer unit provides a means which is responsive to an actuating signal for printing the group of characters that come from the memory tubes. The "High Speed Printer" also has terminal points which have available in proper sequential order, output signals representing each character in the group simultaneously as these characters are passing into the memory unit. The unit also emits a signal corresponding to each character read for timing purposes.

The "High Speed Printer" is further arranged so that it has a switching circuit which can change the condition of the unit from its normal condition in which it reads the electrical impulses and then prints the corresponding characters to a second condition where the characters are only read and no printing occurs.

Figure 1:
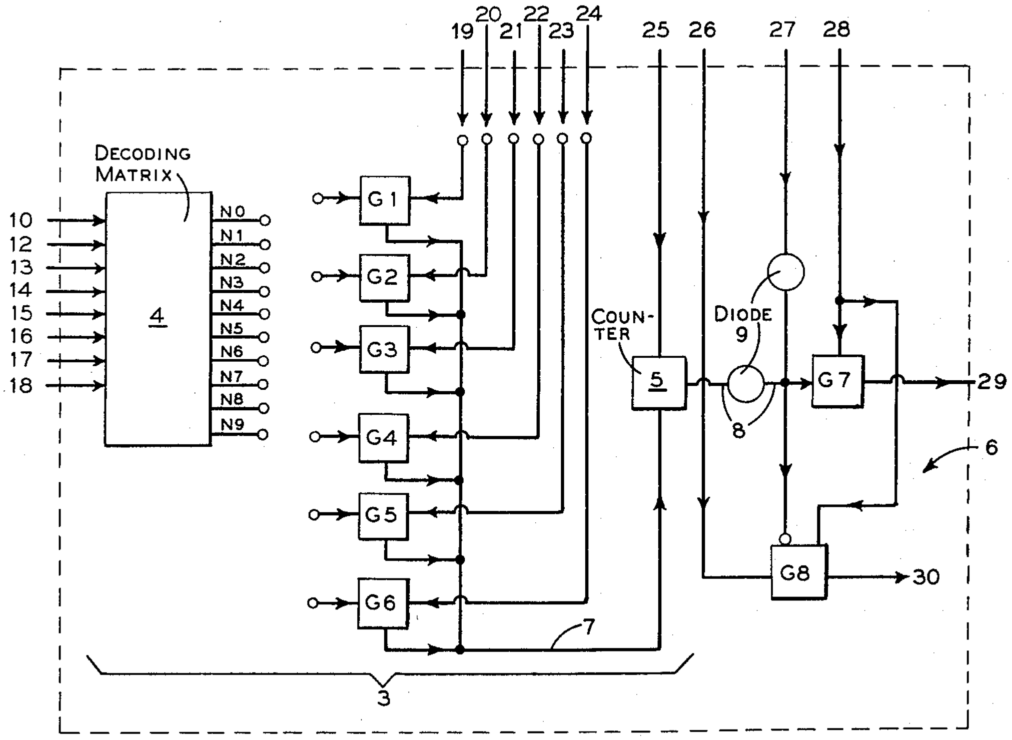
Figure 1 is a schematic logical representation of the invention.

The present invention is illustrated within the rectangular dotted lines in Figure 1 as a separate piece of equipment which is connected by plug leads to the standard outlets available on the "High Speed Printer." Table I is a list of the connecting leads to the "High Speed Printer" which gives the identification of the terminals and the function of that signal.

*Table I*

| Line | High Speed Printer | | Function |
|---|---|---|---|
| | Notation | Terminals | |
| 10 | D | Chassis P3H, Test Terminal C16. | To furnish input signal to decoding matrix in the invention. |
| 12 | $\bar{D}$ | P3H-TT E12 | Do. |
| 13 | E | P3H-TT E14 | Do. |
| 14 | $\bar{E}$ | P3H-TT E18 | Do. |
| 15 | F | P3H-TT C13 | Do. |
| 16 | $\bar{F}$ | P3H-TT C12 | Do. |
| 17 | G | P3H-TT G4 | Do. |
| 18 | $\bar{G}$ | P3H-TT G18 | Do. |
| 19 | AL 1 | Appropriate HSP, Plugboard Hub. | To furnish enabling signal to Gate 1. |
| 20 | AL 2 | do | To furnish enabling signal to Gate 2. |
| 21 | AL 3 | do | To furnish enabling signal to Gate 3. |
| 22 | AL 4 | do | To furnish enabling signal to Gate 4. |
| 23 | AL 5 | do | To furnish enabling signal to Gate 5. |
| 24 | AL 6 | do | To furnish enabling signal to Gate 6. |
| 25 | RS (CL) | Pin 8, Tube V5; P5G. | To clear counter in the invention. |
| 26 | RDF 1 | Pin 1, Tube V12; P5G. | To supply signal to Gate 8 (operating pulse). |
| 27 | ERROR | P2G Terminal 52 | To simultaneously enable Gate 7 and inhibit Gate 8. |
| 28 | FF10 | P5G-TT G14 | To enable Gates 7 and 8. |
| 29 | Gate 16 | Pin 7, Tube V12; P5G. | To enable Gate 16 in HSP which stops tape movement. |
| 30 | RS' | P7G; Terminal 44 | To provide pseudo read start signal to HSP. |

The invention (Figure 1) has character means 3 which searches the "High Speed Printer" character output signals from each of the groups by being connected to terminals 10 to 18. This search is for a predetermined sequential combination of characters in each group. The means is arranged to generate an actuating signal when the combination being searched for is found. This means consisting of a decoding matrix 4, gates G1 to G6, counter 5, and interconnecting wiring particularly connected as hereinafter set forth.

The detecting means 3 is connected to gates G7 and G8 which are connected in the control circuit (not shown) of "High Speed Printer." These gates are arranged to be responsive upon receiving an actuating signal from the detecting means 3, to change the operations of the "High Speed Printer" to cause it to print the character group with which comparison was found. When no actuating signal is passed to the gates G7 and G8, they will cause the "High Speed Printer" to read the characters in the groups continuously without printing any of them.

Figure 2:
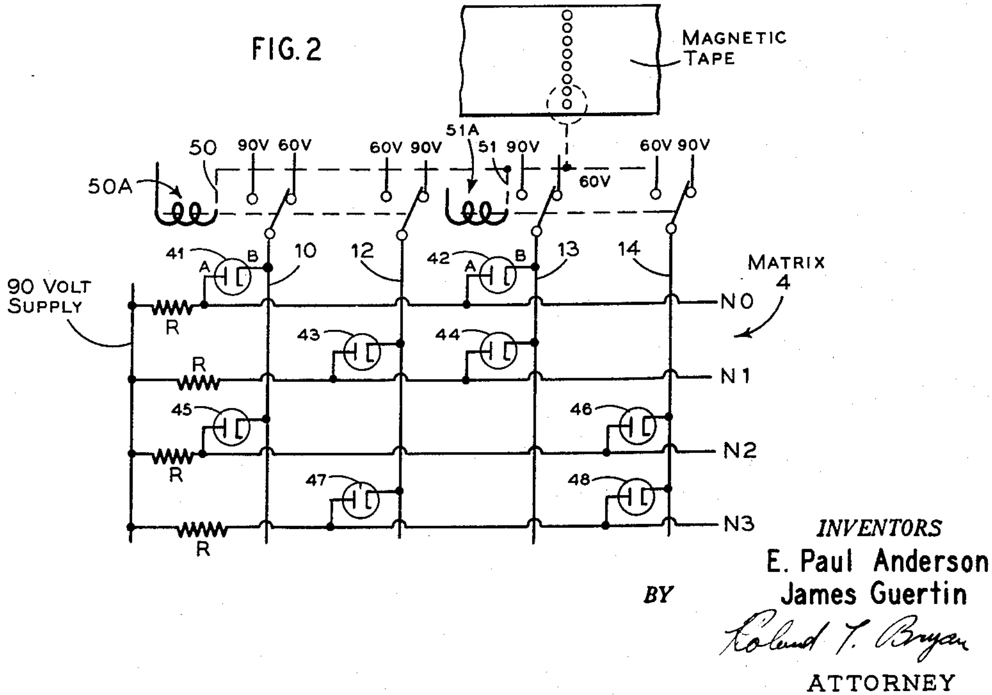
Figure 2 is partial diagram of the matrix decoder.

More specifically, the invention will be illustrated by first describing the operation of the decoding matrix 3 with reference to Figure 2. Therein is shown a portion of the matrix connected to the "High Speed Printer" magnetic tape.

In the "Univac" binary system the characters appear on tape eight magnetized bits or spots. Each of these bits are magnetized to represent a character made up of a predetermined arrangement of zeros and ones. The magnetism or lack of it is translated to signals which activate a bi-stable element as exemplified by a two position relay.

The present invention preferably searches only the numeric portions of each character and, therefore, only searches four of the eight bits of the tape.

Figure 2 shows the typical connection for checking two bits of the four numeric bits.

Signals 50 and 51 represent either that the bits are or are not magnetized. They actuate the relays 50A, 51A which depending upon their position, impose 60 volts or 90 volts on parts of the matrix 4. Thus a current resulting from the field of a magnetic pulse from tape is amplified sufficiently and applied to the solenoid of the relay 50A. The relay will put a 90 volt level on line 10 and 60 volt level on 12. Although relays 50A and 51A are illustrated, the invention could equally use bi-stable elements which have two stable states. These elements are ordinarily referred to as "flip-flops" and they take their position depending upon the level of the signal imposed on them.

The matrix 4 has lines 10, 12, 13 and 14 which will be at either a 60 or a 90 volt level dependent upon the status of relays 50A, 51A that are actuated by the result of introducing a signal from a magnetic pulse from tape. Lines 12 and 14 will always assume the opposite level of its counterpart lines 10 and 13, i.e., If 10=60 volts; 12=90 volts
If 13=90 volts; 14=60 volts A number of diodes 41 to 48 are connected across the intersecting lines of the matrix. It is the nature of a diode to pass current in only one direction. When current is passed by a diode, it tends to become a short circuit.

Since an actual short circuit would "blow a fuse" in the voltage supply, it is necessary to add voltage dropping resistors R between the diodes and the 90 volt supply to the matrix. These resistors will essentially allow the plates of the diodes to be pulled down to that of the voltage levels of the cathodes without causing voltage supply problems.

In the event neither of the two diodes, attached to each of the lines N0, N1, N2 or N3, is passing current, that specific line will assume the voltage level applied to the matrix (90 volts).

A typical selection example of the matrix is as follows:

10=60 volts 13=90 volts
12=90 volts 14=60 volts

Line N0 will be at a 60 volt level since diode 41 will pass current.

Line N1 will be at a 90 volt level since neither diode 43 or 44 will pass current.

N2 will be at a 60 volt level since diode 45 will pass current.

Line N3 will be at a 60 volt level since diode 48 will pass current.

Therefore, Line N1 will be the selected line since it is at a 90 volt level and lines N0, N2 and N3 are at a 60 volt level.

The numeric signals (90 volts) are the output of the matrix and are each available at the corresponding termianls N0 to N9.

The selection of the numeric sequence is done by plug connections between terminals N0 to N9 and gates G1 to G6. The connections made will depend upon the sequence of numeric characters being searched for as hereafter explained.

A gate such as G1 is a device which permits a prohibits passage of signals from one point to another, when controlled by a second signal. Thus in Figure 1 gate G1 will pass a signal through into counting input line 7 when line 19 is imposing a signal on it. If line 19 has no signal, no signal would pass out of the gate G1 to line 7.

Gates G1 to G6 are arranged with individual plug inputs and in parallel to discharge their outputs into a common line 7 for furnishing inputs to the counter 5. Each of the gates G1 to G6 has corresponding control input lines 19 to 24 each of which transmits a signal (called "address lines") corresponding to a particular character position on the tape in the "High Speed Printer." For instance, line 19 could be connected to furnish a signal when the nineteenth character in a group was read by the printer.

The second important portion of the detecting means 3 is the counter 5. It has connected to it an input line 25 which sends a clearing signal from the "High Speed Printer" at the start of the reading of each group of characters from tape. This clearing signal erases the count thereon so that the counter 5 will be in a position to count during the reading of the next group of characters.

The counter may be any of the well known mechanical, electromechanical, or electronic types. For instance, for the counter 5, there may be used a ring counter or a parallel resistance condenser (RC) combination connected to a control grid of a thyratron.

Further, the function of the gates G1 to G6 and counter 5 may be accomplished by means of a bank of six dual grid thyratrons. For instance, by applying one of the numeric outputs N0 to N9 of the matrix 4 to one grid of a thyratron and one of the address lines 19 to 24 to the second grid and when there is a coincidence of numeric output and address line, the thyratron would fire. If there are six thyratrons so connected the resultant circuit can be capable of passing an actuating signal upon a count which is equal to or less than six.

The output of the counter 5 is an actuating signal which flows in line 8 which is connected as an input to gate G7. A buffer diode 9 is in line 8 to provide unidirectional current flow. Line 27 is also connected in to line 8 and it supplies an error signal from the "High Speed Printer" which is buffered by a diode 9 whenever there is something wrong in reading a group of characters. Gate 7 is arranged with an enabling input 28 which represents a signal indicating that the group has been completely counted in the "High Speed Printer." The output line 29 from gate G7 sends a signal to the "High Speed Printer" to cause it to stop the movement of tape and to print the group from memory or, if an error, to hold the machine in a stopped position for manual correction. These two functions are determined by operations wholly within the "High Speed Printer," if the connection 29 is made thereto as indicated in Table I.

A second gate G8 is used in the switching circuit to control the operation of the "High Speed Printer" when either an error has been found or there is no count of six coming from the counter 5. This gate is a negative one which is arranged to pass therethrough an enabling signal 26 when there is no actuating signal in line 8 or no error signal in line 27 and there is a full count of the group as indicated by a signal in line 28. The enabling signal flows in line 30 to the "High Speed Printer" and causes it to continue the high speed reading of the tape after each group is read, compared and no comparison is found by the present invention.

For a further understanding of the invention, there will be described a typical operation. Assume there is desired to print a certain group of information on a tape that has the number 5 at position 5, 8 at position 8, 3 at position 30, 4 at 34, 6 at 46 and 7 at 57. The "High Speed Printer" would be set in its normal state such that it would read each group and then print it. This is done in that unit by a circuit which receives a signal after each group is read into the memory. This signal causes the tape to stop and if there is no error signal, to cause the printing of the group from the memory. At the end of printing, there is a second signal which causes the tape to start again and the reading cycle begins. If the signal which stops the tape is inhibited, the "High Speed Printer" can enter its read cycle immediately after it has read each group and the result is that the searching of the tape is accomplished in the fastest time possible.

Therefore, with the present invention connected to the "High Speed Printer" as indicated in Table I, the matrix 4 will issue numeric signals, and for the above example, on lines N5, N8, N3, N4, N6 and N7 whenever they appear in each group on tape. These numeric signals will be connected by plug leads to the gates G1 to G6 as follows; N5 to G1, N8 to G2, N3 to G3, N4 to G4, N6 to G5, and N7 to G6. The address signals from the "High Speed Printer" would be connected so that 19 would carry a signal corresponding to character position 5 on tape 20 to character position 8, 21 to position 30, 22 to position 34, 23 to position 46 and 24 to position 57. If there is a numeric signal on N5 at position 5 on the tape, there would pass a counting signal in line 7 to the counter 5. Accordingly, if the other numbers of the predetermined sequence are found, the counter 5 will issue an actuating signal in line 8 which will pass through the buffer diode 9 and stay at gates G7 to G8 until the group is all counted into the memory and the enabling signal is passed by line 28. Thus the "High Speed Printer" receives a signal which will operate switch means within it to cause the printing of the group in which comparison was found, if there is no error signal in the "Printer."

In the case where the detection means 3 does not find comparison and no error is present, the enabling signal in line 28 will cause the "Printer" to be inhibited as described above and it will continue to have the tape read at high speed.

The present invention provides a means for operating a digital computer arrangement at a higher continuous speed and thus saves on machine time.

Although the invention has been illustrated with reference to a printer reading from tape, it is contemplated that it would operate equally well where a printer is receiving the output of a digital computer and only certain groups are to be printed.

While in accordance with the provisions of the statues we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

We claim:

1. In a digital computor arrangement having means for producing a plurality of electrical pulses arranged in a sequential order to represent a group of encoded characters, means for reading and storing the entire group into a memory device, means responsive to an actuating signal for printing the group of characters from the memory device, means for sequentially emitting character output signals representing each character in the group, and a printer control circuit selectively operable to activate the arrangement to continuously read without printing or to print the group of characters in the memory, the improvement comprising means for searching the character output signals from each of said groups for a predetermined sequential combination of characters and generating an actuating signal when such combination is found, and switch means connected in said printer control circuit and responsive, upon receiving said actuating signal, to print the group of memory-stored characters having said predetermined sequential combination and upon cessation of said actuating signal to be positionable to read without printing the subsequent character groups.

2. In a digital computer arrangement having means for producing a plurality of electrical pulses arranged in a predetermined order to represent a group of encoded characters means for reading and storing the entire group into a memory device, means responsive to an actuating signal for printing the group of characters from the memory device, means for sequentially emitting character output signals representing each character in the group, and a printer control circuit selectively operable to activate the arrangement to continuously read without printing or to print the group of characters from the memory, the improvement comprising a code detection circuit including means for searching the character output signals from said storage system for a predetermined sequential combination of characters and issuing a counting signal for each character found in a predetermined position, a counter receiving the counting signal and arranged to issue an actuating signal upon reaching a predetermined count per group, and switch means connected in said printer control circuit and responsive upon receiving said actuating signal to print the group of memory-stored characters having said predetermined sequential combination and upon cessation of said actuating signal to be positionable to read without printing the character groups.

3. In a digital computer arrangement having means for producing a plurality of electrical pulses arranged in a predetermined order to represent a group of encoded characters means for reading and storing the entire group into a memory device, means responsive to an actuating signal for printing the group of characters from the memory device, means for sequentially emitting character output signals representing each character in the group, and a printer control circuit selectively operable to activate the arrangement to continuously read without printing or to print the group of characters from the memory, the improvement comprising a code detection circuit including means operable, responsive to receipt of said character outputs, to sequentially emit the decimal numeric signals corresponding thereto, and means for receiving said numeric signals and comparing said last named signals to a predetermined sequential combination of numeric signals residing in said character group and generating a corresponding counting signal, a counter receiving the counting signal and arranged to issue an actuating signal upon reaching a predetermined count per group, and switch means connected in said printer control circuit and responsive upon receiving said actuating signal to print the group of memory-stored characters having said predetermined sequential combination and upon cessation of said actuating signal to be positionable to read without printing the character groups.

4. In a digital computer arrangement having means for producing a plurality of electrical pulses arranged in a predetermined order to represent a group of encoded characters means for reading and storing the entire group into a memory device, means responsive to an actuating signal for printing the group of characters from the memory device, means for sequentially emitting character output signals representing each character in the group, means providing a non-code signal for each character read, and a printer control circuit selectively operable to activate the arrangement to continuously read without printing or to print the group of characters from the memory, the improvement comprising a code detection circuit including means operable, responsive to receipt of said character outputs, to sequentially emit the decimal numeric signals corresponding thereto, with each signal being led to a separate terminal, and a gate connected to each of said terminals and operable, responsive to receipt of a predetermined non-code signal and a numeric signal, to emit a counting signal, a counter receiving the counting signal and arranged to issue an actuating signal upon reaching a predetermined count per group, and switch means connected in said printer control circuit and responsive upon receiving said actuating signal to print the group of memory-stored characters having said predetermined sequential combination and upon cessation of said actuating signal to be positionable to read without printing the character groups.

5. In a digital computer printer arrangement having means for producing electrical pulses arranged in a predetermined order to represent a plurality of groups of encoded characters, means for reading and storing each group of characters sequentially into a memory device; means generating a control signal at the end of the reading of each character group into said memory; a printer control circuit responsive to said control signal to sequentially stop the reading of character groups, print the stored group from the memory, and start the reading of the next group at the end of the printing of the previous group; the invention comprising means connected into said control circuit responsive to said control signal for introducing a pseudo read start signal thereinto at a position to directly cause the reading of the next group whereby the portion of said control circuit is by-passed which causes the printer to stop reading, print and restart the reading.

No references cited.